US012356516B2

(12) United States Patent
Sakakibara et al.

(10) Patent No.: US 12,356,516 B2
(45) Date of Patent: Jul. 8, 2025

(54) VEHICLE WINDOW GLASS WITH METAL TERMINAL

(71) Applicant: AGC Inc., Tokyo (JP)

(72) Inventors: Masanori Sakakibara, Tokyo (JP); Toru Koga, Tokyo (JP); Yoshiyuki Kuwahara, Tokyo (JP)

(73) Assignee: AGC INC., Tokyo (JP)

( * ) Notice: Subject to any disclaimer, the term of this patent is extended or adjusted under 35 U.S.C. 154(b) by 792 days.

(21) Appl. No.: 17/537,859

(22) Filed: Nov. 30, 2021

(65) Prior Publication Data

US 2022/0174790 A1 Jun. 2, 2022

(30) Foreign Application Priority Data

Dec. 1, 2020 (JP) ................................ 2020-199573

(51) Int. Cl.
*H05B 3/86* (2006.01)
*H01R 4/02* (2006.01)

(52) U.S. Cl.
CPC .............. *H05B 3/86* (2013.01); *H01R 4/023* (2013.01); *H01R 4/025* (2013.01); *H01R 2201/26* (2013.01); *H05B 2203/016* (2013.01)

(58) Field of Classification Search
CPC ...... H05B 2203/016; H05B 3/84; H05B 3/86; H05B 2203/013; H05B 2203/017; H05B 3/06; H05B 2203/002; H05B 2203/005; H05B 2203/011; B23K 35/262; B23K 1/0008; B23K 35/00; B23K 35/0222; B23K 35/36; B23K 35/02; B23K 35/025; B23K 35/26; B23K 35/264; B23K 35/3006
USPC ....... 219/203, 202, 213, 214, 218, 219, 541, 219/542
See application file for complete search history.

(56) References Cited

U.S. PATENT DOCUMENTS

| | | | | |
|---|---|---|---|---|
| 2017/0312859 | A1* | 11/2017 | Tokiwa | C03C 27/04 |
| 2018/0200997 | A1* | 7/2018 | Tokiwa | H05B 3/84 |

FOREIGN PATENT DOCUMENTS

| | | | | |
|---|---|---|---|---|
| JP | 2016-081589 | A | | 5/2016 |
| JP | 2016-199128 | A | | 12/2016 |
| JP | 2017-022047 | A | | 1/2017 |
| JP | 6468434 | B2 | * | 2/2019 |
| JP | 2020077468 | A | * | 5/2020 |

OTHER PUBLICATIONS

English translation of JP-6468434-B2 (Year: 2019).*
English translation of JP-2020077468-A (Year: 2020).*

* cited by examiner

*Primary Examiner* — Chris Q Liu
(74) *Attorney, Agent, or Firm* — Foley & Lardner LLP

(57) ABSTRACT

A vehicle window glass with a metal terminal includes a glass plate, a conductor disposed on at least one of principal surfaces of the glass plate, and a metal terminal electrically connected to the conductor via solders. The metal terminal includes a connection portion; a first leg portion connected to the connection portion; a first base portion connected to the first leg portion; a second leg portion connected to the connection portion; a second base portion connected to the second leg portion; and a lead wire connection portion connected to the connection portion and including a rising portion and a bent portion connected to the rising portion, and a fixing portion connected to the bent portion and configured to be connected to a lead wire.

14 Claims, 7 Drawing Sheets

VEHICLE WINDOW GLASS WITH METAL TERMINAL

TECHNICAL FIELD

The present invention relates to a vehicle window glass with a metal terminal.

BACKGROUND ART

Some vehicle window glasses include an electrical heater made of a conductor, disposed on a glass plate for, for example, defogging or deicing. Some vehicle window glasses include an antenna made of a conductor and disposed on a glass plate for utilizing the antenna in a radio receiver, a TV receiver, wireless communication or a sensor.

Each of such conductors is electrically connected, via a solder, to a metal terminal on the vehicle window glass so as to supply power to the conductor or to receive and transmit a signal or the like. The metal terminal is also fixed to a lead wire, which is electrically connected to a power source or a signal source installed in the vehicle.

For example, Patent Document 1 listed below discloses a laminated glass, which includes an interior side glass plate, the interior side glass being partially cut out such that conductors disposed on an interior side surface of an exterior side glass plate are partially exposed, and that the exposed portions of the conductors are electrically connected, via solders, to metal terminals, each of the metal terminals having leg portions and base portions, the leg portions being longer than the thickness of the interior side glass plate.

PRIOR ART DOCUMENTS

Patent Documents

Patent Document 1: JP-A-2016-199128

DISCLOSURE OF INVENTION

Technical Problem

When an external force is applied to the metal terminal connected to a conductor, or the lead wire fixed to a metal terminal, moment could be applied to a base portion of the metal terminal to crack the glass plate.

The present invention is proposed in consideration of this problem. It is an object of the present invention to provide a vehicle window glass with a metal terminal, which is capable of reducing the occurrence of a crack in a glass plate even when an external force is applied to the metal terminal connected to a conductor, or the lead wire fixed to a metal terminal.

Solution to Problem

According to one mode of the present invention, there is provided a vehicle window glass with a metal terminal, which includes a glass plate; a conductor, the conductor disposed on at least one of principal surfaces of the glass plate; and a metal terminal, the metal terminal electrically connected to the conductor via solders; wherein the metal terminal includes a connection portion, the connection portion including a first side, a second side, a third side, and a fourth side, the second side opposing the first side, the third side and the fourth side being adjacent to the first side and the second side, and opposite to each other; a first leg portion, the first leg portion connected to the first side and separating the connection portion from the conductor; a first base portion, the first base portion connected to the first leg portion, electrically connected to the conductor via a solder, and projecting toward a direction away from the fourth side from an imaginary extension line of the third side; a second leg portion, the second leg portion connected to the second side and separating the connection portion from the conductor; a second base portion, the second base portion connected to the second leg portion, electrically connected to the conductor via a solder, and projecting toward a direction away from the fourth side from an imaginary extension line of the third side; and a lead wire connection portion, the lead wire connection portion connected to the third side of the connection portion, the lead wire connection portion including a rising portion extending in a direction remote from the conductor, a bent portion connected to the rising portion and extending toward the fourth side, and a fixing portion connected to the bent portion and configured to be connected to a lead wire.

Advantageous Effects of Invention

The vehicle window glass with a metal terminal according to the one mode can reduce the occurrence of a crack in a glass plate even when an external force is applied to the metal terminal connected to a conductor, or the lead wire fixed to a metal terminal.

DESCRIPTION OF EMBODIMENTS

Figure 1:
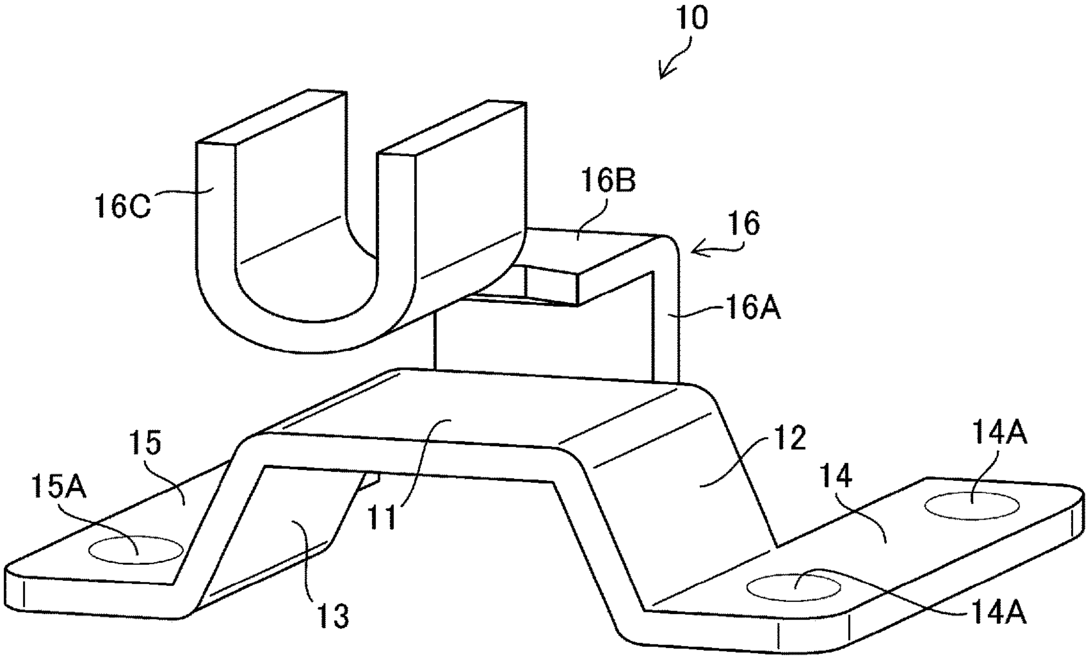
FIG. 1 is a perspective view illustrating the metal terminal according to an embodiment of the present invention.

Now, some embodiments of the vehicle window glass with a metal terminal will be described in reference to the accompanying drawings. It should be noted that the elements described with respect to the embodiments are merely examples, and that the present invention is not limited to a vehicle window glass with a metal terminal, which includes these elements. Moreover, the dimensional relationship among respective elements shown in the drawings does not always reflect actual scales.

Metal Terminal

Figure 2:
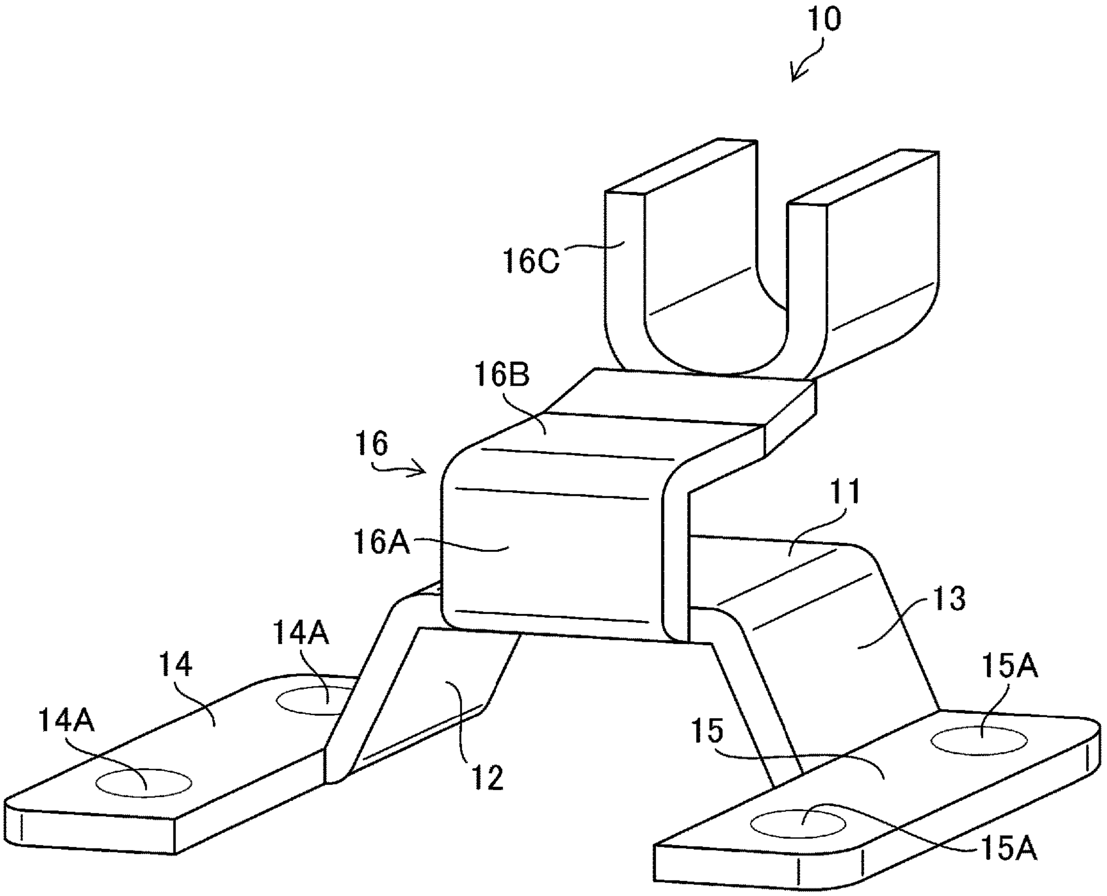
FIG. 2 is a perspective view illustrating the metal terminal, which is seen from a direction different from the direction of FIG. 1.

The metal terminal attached to the vehicle window glass with a metal terminal according to an embodiment will be described in reference to the accompanying drawings. FIG. 1 is a perspective view illustrating the metal terminal according to this embodiment, and FIG. 2 is a perspective view illustrating the metal terminal, which is seen from a direction different from the direction of FIG. 1.

As shown in FIG. 1, the metal terminal 1 includes a connection portion 11, a first leg portion 12 connected to the connection portion 11, a first base portion 14 connected to the first leg portion 12, a second leg portion 13 connected to the connection portion 11, and a second base portion 15 connected to the second leg portion 13. The first leg portion 12 and the second leg portion 13 serve to separate the connection portion 11 from a conductor. The connection portion 11 connects the first leg portion 12 and the second leg portion 13 to a lead wire connection portion 16.

The first base portion 14 and the second base portion 15 are portions that are electrically connected, via solders, to the conductor, which is disposed on a glass plate. The first base portion 14 may have two dents 14A disposed thereon. The formation of the dents 14A makes projections on a surface of the first base portion opposite to the surface where the dents 14A are disposed. Likewise, the second base portion 15 may also have two dents 15A disposed thereon. The formation of the dents 15A makes projections on a surface of the second base portion opposite to the surface where the dents 15A are disposed.

The metal terminal 10 includes the lead wire connection portion 16 connected to the connection portion 11.

The lead wire connection portion 16 includes a rising portion 16A connected to the connection portion 11, a bent portion 16B connected to the rising portion 16A, and a fixing portion 16C connected to the bent portion 16B. The rising portion 16A extends in a direction remote from the first base portion 14 and the second base portion 15. The bent portion 16B extends in a direction to overlap with the connection portion 11 in plan view. The fixing portion 16C is connected to a leading edge of the bent portion 16B. The leading edge of the bent portion 16B is configured to be inclined in a direction to be away from the connection portion 11 toward the fixing portion 16C. The fixing portion 16C has a function of fixing a lead wire. The lead wire is fixed on a surface of the fixing portion 16C remote from the surface of the glass plate where the conductor is disposed. In other words, the lead wire is fixed on a surface of the fixed portion 16C on the opposite side of the connecting portion 11

In this embodiment, the fixing portion 16C is formed as a caulking portion. The caulking portion is formed in a U-shape including a pair of opposing wall portions, and a connection portion connecting ends of the paired wall portions. In other words, the lead wire is caulked by bending the fixing portion 16C in a direction away from the surface of the glass plate where the conductor is disposed. Alternatively, the lead wire is caulked by bending the fixing portion 16C in a direction to remote from the connection portion 11. Alternatively, the fixing portion 16C may be formed as a brazing portion or a welding portion. The fixing portion 16C and a portion of the lead wire to be fixed to the fixing portion 16C may be covered with a protection member made of an insulator. The insulator may be made of an insulating material, such as an insulating resin. The resin is preferably a material having excellent flexibility. There is no particular limitation to the kind of the resin. The resin may be made of polyvinyl chloride, a fluororesin, natural rubber, synthetic rubber, polyethylene terephthalate, polyolefin, or polyimide. In a case where the fixing portion 16C and a portion of the lead wire to be fixed to the fixing portion 16C are covered with such a protection member made of an insulator, even when an external force is applied to the metal terminal 10 or the lead wire to deform the metal terminal 10 such that the metal terminal 10 is brought into direct contact with a vehicle window glass or a metal vehicle body, the vehicle window glass is prevented from being damaged, or shorting to the vehicle body is prevented, which is preferable.

Figure 3A:
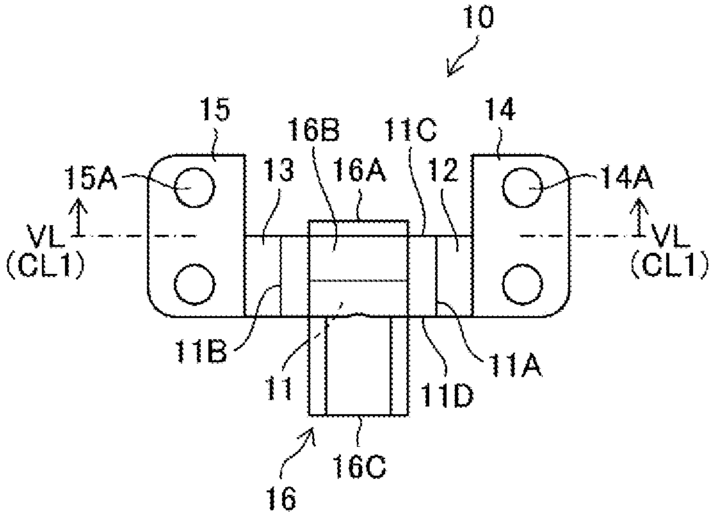
FIGS. 3A to 3C are three different views, i.e., a plan view, a front view, and a side view, respectively.
Figure 3B:
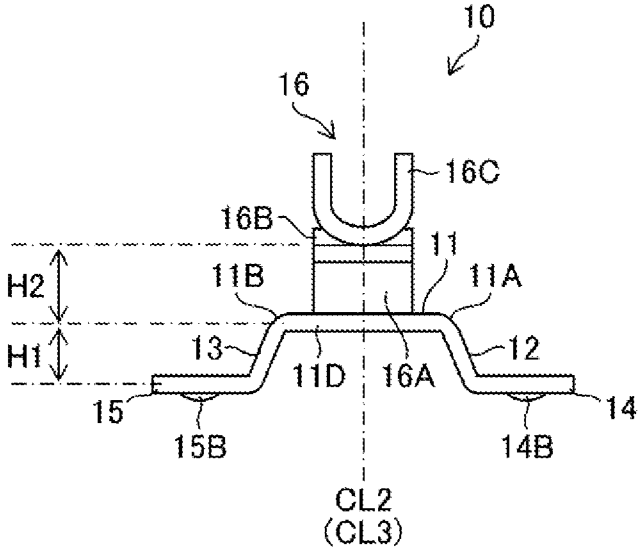
Figure 3C:
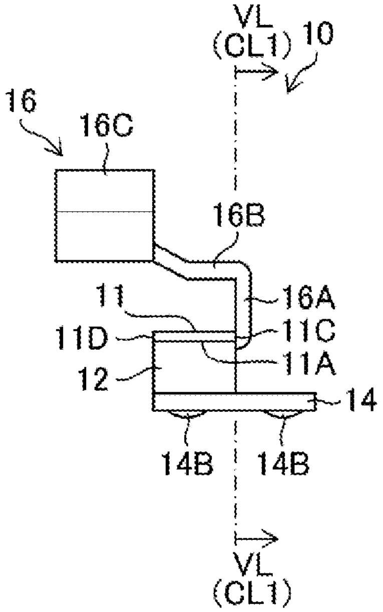

FIGS. 3A to 3C are three different views, i.e., a plan view, a front view, and a side view, respectively.

As shown in FIG. 3A, the connection portion 11 is formed in a rectangular shape in plan view. The connection portion 11 includes a first side 11A, a second side 11B opposite to the first side 11A, and a third side 11C and a fourth side 11D adjacent to the first side 11A and the second side 11B, the third side 11C and a fourth side 11D being opposite to each other. In the embodiment shown in FIG. 3A, the first side 11A and the second side 11B are shorter sides of the connection portion 11 while the third side 11C and the fourth side 11D correspond to longer sides of the connection portion 11.

As shown in FIGS. 3A to 3C, the first side 11A of the connection portion 11 is connected to the first leg portion 12. The first leg portion 12 is connected to the first base portion 14. The second side 11B of the connection portion 11 is connected to the second leg portion 13. The second leg portion 13 is connected to the second base portion 15.

As shown in FIGS. 3A and 3C, the first base portion 14 and the second base portion 15 project beyond an imaginary extension line VL of the third side 11C in a direction remote from the fourth side 11D (in an arrowed direction). In this embodiment, the imaginary extension line VL of the third side 11C substantially accords with a centerline CL1 connecting between the centers of the first base portion 14 and the second base portion 15. It should be noted that the distance between the imaginary extension line VL and the centerline CL1 is preferable within a range of 2.0 mm.

The lead wire connection portion 16 includes the rising portion 16A connected to the third side 11C of the connection portion 11. The rising portion 16A extends in a direction remote from the conductor to be connected to the first base portion 14 and the second base portion 15. The rising portion 16A is substantially perpendicular to the connection portion 11. The rising portion 16A connected to the third side 11C is also disposed at a position substantially according with the centerline CL1 connecting between the centers of the first base portion 14 and the second base portion 15. The connection portion 11 has a centerline CL2 according with the centerline CL3 of the rising portion 16A. The distance between the centerline CL2 and the centerline CL3 is preferable within a range of 2.0 mm.

The lead wire connection portion 16 includes the bent portion 16B connected to the rising portion 16A and extending toward the fourth side 11D. The bent portion 16B is substantially perpendicular to the rising portion 16A and overlaps with the connection portion 11 in plan view.

The lead wire connection portion 16 includes the fixing portion 16C connected to the bent portion 16B. The fixing portion 16C is connected to the leading edge of the bent portion 16B. In this embodiment, the fixing portion 16C is disposed at a position which is beyond the fourth side 11D and does not overlap with the connection portion 11 in plan view.

The distance H1 between the center of the thickness of the connection portion 11 and the center of the thickness of each of the first base portion 14 and the second base portion 15 is preferably at least 0.5 mm and at most 6.0 mm. The distance H2 between the center of the thickness of the connection portion 11 and the fixing portion 16C is preferably at least 0.5 mm and at most 5.0 mm. In other words, the distance H1 between the center of the thickness of the connection portion 11 and the center of the thickness of each of the first base portion 14 and the second base portion 15 is the same as or longer than the distance H2 between the center of the thickness of the connection portion 11 and the fixing portion 16C.

The metal terminal 10 according to this embodiment may contain at least one selected from the group consisting of copper, brass, iron, chromium, and an alloy containing copper, brass, iron, and chromium. The metal terminal 10 may be subjected to surface machining, such as tin plating. The metal terminal has a thickness of preferably at least 0.4 mm and at most 0.8 mm. The metal terminal 10 may be prepared by pressing or bending a metal plate.

Vehicle Window Glass with Metal Terminal

Figure 4:
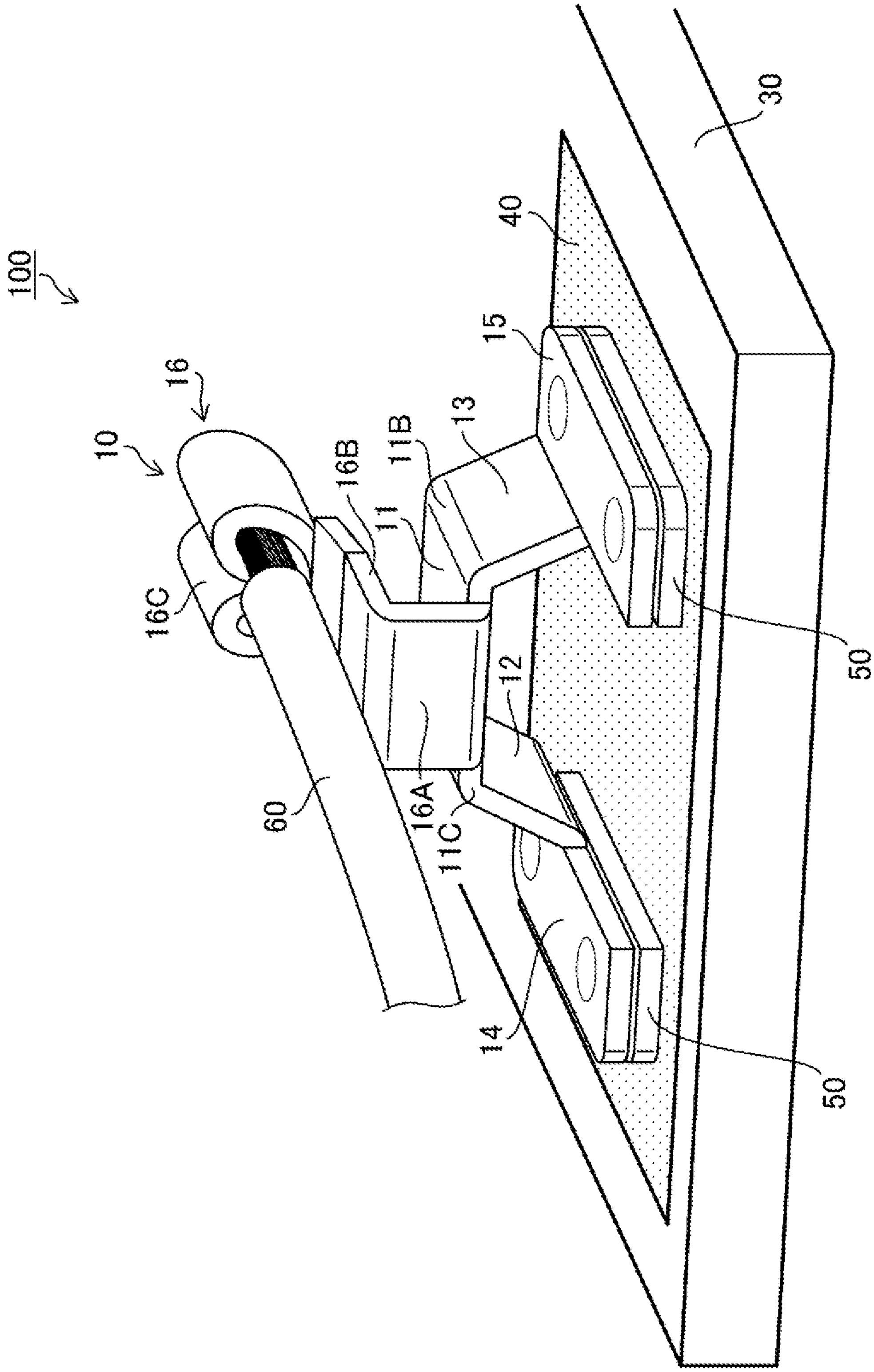
FIG. 4 is a perspective view illustrating the vehicle window glass with a metal terminal according to the embodiment.

The vehicle window glass with a metal terminal according to this embodiment will be described in reference to the accompanying drawings. FIG. 4 is a perspective view of the vehicle window glass with a metal terminal, and FIG. 5 is a side view of the vehicle window glass with a metal terminal.

Figure 5:
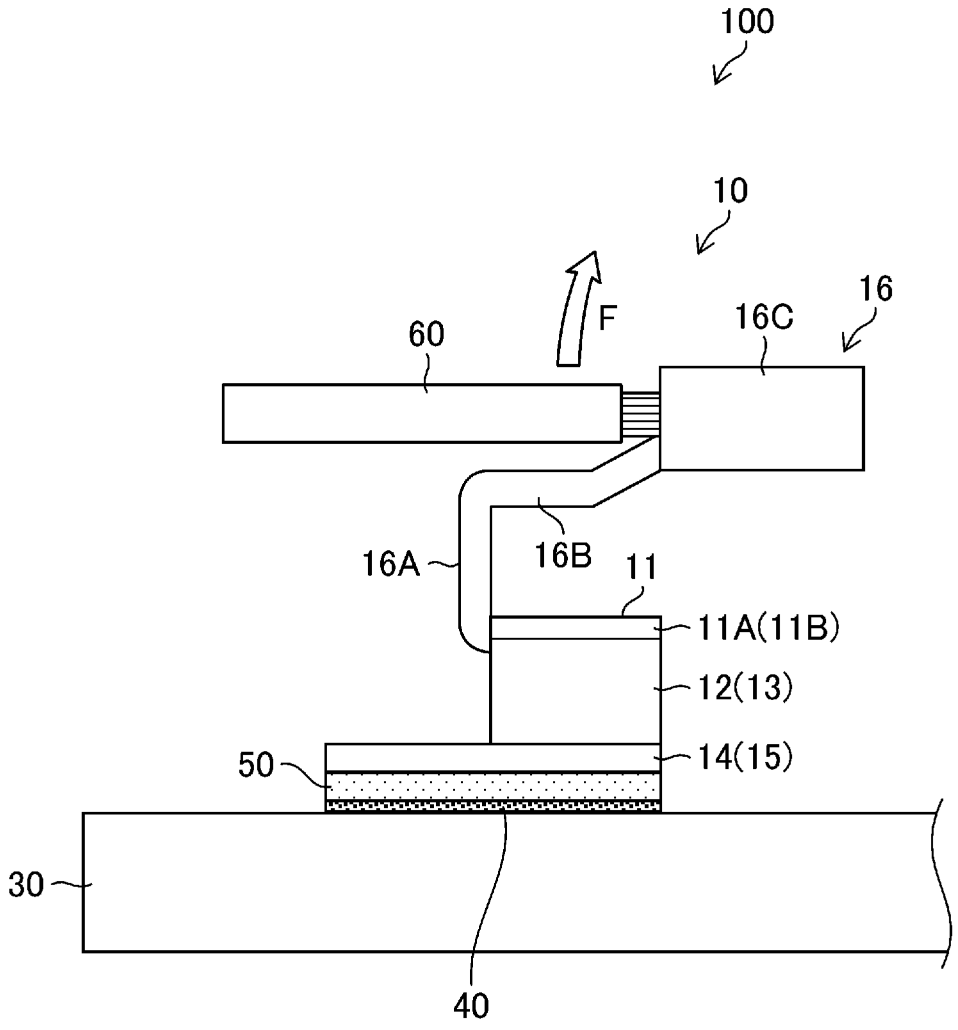
FIG. 5 is a side view illustrating the vehicle window glass with a metal terminal.

As shown in FIGS. 4 and 5, the vehicle window glass with a metal terminal 100 includes a glass plate 30, the conductor 40 disposed on at least one principal surface of the glass plate 30, and the metal terminal 10 connected to the conductor 40 via the solders 50.

The glass plate 30 may be made of, for example, soda-lime glass, borosilicate glass, alkali-free glass, or quartz glass, without particular limitation. Among them, soda-lime glass is particularly preferable. The glass plate 30 may be made of either non-tempered glass or tempered glass. The tempered glass may be either physically tempered glass (such as glass tempered by air quenching) or chemically tempered glass. The non-tempered glass is prepared by forming molten glass in a plate shape and annealing the formed glass. The tempered glass is prepared by producing a compressive stress layer in the surface of non-tempered glass. When the glass plate is made of physically tempered glass, the glass plate may have a glass surface tempered by uniformly heating the glass plate and quenching the heated glass plate from a temperature close to its softening point to produce compressive stress in the glass surface by its temperature difference between the glass surface and the inside of the glass plate. When the glass plate is made of chemically tempered glass, the glass plate may have a glass surface tempered by producing compressive stress in the glass surface by ion exchange or the like. Although the glass plate 30 is preferably transparent, the glass plate may be colored to a degree not to deteriorate transparency. Although there is no particular limitation to the thickness of the glass plate 30, the thickness is preferably at least 0.5 mm and at most 5.0 mm.

The conductor 40 may be prepared by printing or applying conductive silver paste (material having an electrical resistivity of 0.5 to $9.0\times10^{-8}$ Ω·m) on a principal surface of the glass plate 30 and baking the paste, for example. The conductor 40 has a thickness of preferably at least 3 μm and at most 15 μm, more preferably at least 3 μm and at most 10 μm. The conductor 40 may be used to form a busbar.

The solders 50 may be lead-free solders or leaded solders. The solders 50 are preferably lead-free solders containing almost no lead. Although there is no particular limitation to the lead-free solders, each of the lead-free solders preferably contains Sn (tin) and Ag (silver), such as an Sn—Ag-based solder, an Sn—Ag—In-based solder, an Sn—Ag—Al—Zn-based solder, an Sn—Al—In—Ag—Cu—Zn-based solder or an Sn—Ag—Cu-based solder. In these cases, the content of the Sn (tin) is preferably at least 95 weight %.

The metal terminal 10 is placed on the conductor 40 disposed on the glass plate 30. The first base portion 14 and the second base portion 15 of the metal terminal 10 are electrically connected to the conductor 40 via the solders 50. The first leg portion 12 and the second leg portion 13 separate the connection portion 11 from the conductor 40. In this embodiment, each of the first base portion 14 and the second base portion 15 has a portion projecting beyond the third side 11C of the connection portion 11 and facing toward an extending direction of the lead wire 60. Thus, the rising portion 16A of the lead wire connection portion 16 and the third side 11C of the connection portion 11 face toward the extending direction of the lead wire 60.

The lead wire 60 is caulked and fixed to the fixing portion 16C of the lead wire connection portion 16. The lead wire 60 includes a core wire and an insulator covering the core wire. The lead wire 60 has one end of the core wire projecting from the insulator to be caulked by the fixing portion 16C. Thus, the lead wire 60 and the conductor 40 are electrically connected to each other via the metal terminal 10 and the solders 50.

The core wire is made of, for example, metal. Although there is no particular limitation to the kind of the metal, the core wire may be made of, for example, gold, silver, nickel, copper, aluminum, tin, cobalt or an alloy containing at least one of these elements. The core wire may be a single linear wire made of an electrically conductive material or a bundle of the linear wires made of an electrically conductive material. The core wire has a diameter of about 2 mm to about 8 mm. The diameter of the core wire is not limited to this range. The insulator is made of an insulating material, and may be made of, for example, an insulating resin. The resin is preferably a material having excellent flexibility. Although there is no particular limitation to the resin, the resin may be made of, for example, polyethylene terephthalate, polypropylene, polyethylene or polyimide.

The metal terminal 10 is preferably disposed on an interior side of the vehicle window glass with a metal terminal 100 when the vehicle window glass is mounted to a vehicle.

As shown in FIG. 5, in the vehicle window glass with a metal terminal 100, the lead wire connection portion 16 and the connection portion 11 are configured to be form a U-shape opening at the fourth side 11D of the connection portion 11 as viewed in a side view where the first side 11A or the second side 11B is shown.

When an external force F is applied to the lead wire 60 in a direction perpendicular to the glass plate 30, the external force is applied to the lead wire connection portion 16 as well. When the external force is applied to the lead wire connection portion 16, the lead wire connection portion 16 is deformed by the external force F since the metal terminal 10 is configured as described above. The lead wire connection portion 16 can be deformed to reduce the transmission of the external force F to the first base portion 14 and the second base portion 15. Even when the external force F is transmitted to the first base portion 14 and the second base portion 15, the lead wire connection portion 16 can be deformed to uniformly apply forces to the first base portion 14 and the second base portion 15. Thus, the vehicle window glass with a metal terminal 100 can reduce the occurrence of a crack in the glass plate 30 caused by the external force applied to the metal terminal 10.

In FIG. 5, the lead wire 60 is fixed to the fixing portion 16C in a direction to extend from the fixing portion 16C toward the third side 11C of the connection portion 11. The fixing direction is not limited to this direction. The lead wire 60 may be fixed to the fixing portion 16C in a direction to extend from the fixing portion 16C and away from the fourth side 11D of the connection portion 11.

Figure 6:
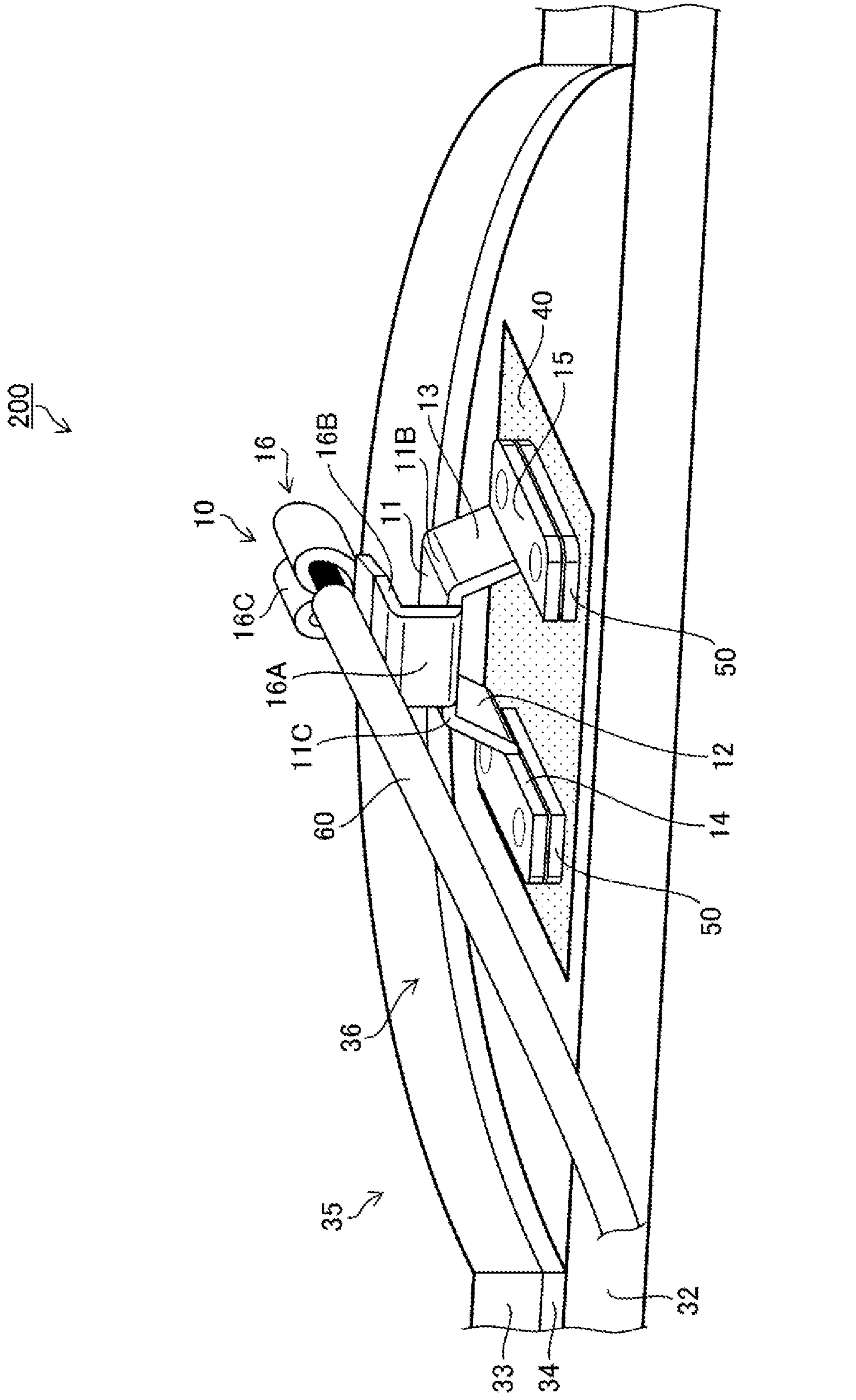
FIG. 6 is a perspective view illustrating the vehicle window glass with a metal terminal according to another embodiment.

Now, the vehicle window glass with a metal terminal according to another embodiment of the present invention will be described in reference to the accompanying drawings. As shown in FIG. 6, the vehicle window glass with a metal terminal 200 according to this embodiment includes a laminated glass 35 having a first glass plate 32, a second glass plate 33, and an interlayer 34 joining the first and second glass plates. The first glass plate 32 serves as one of the glass plates while the second glass plate 33 serves as the other glass plate. The vehicle window glass with a metal terminal 200 may be applied to a vehicle windshield, for example. When the vehicle window glass with a metal terminal 200 is assembled to a vehicle, the first glass plate 32 is positioned on an exterior side while the second glass plate 33 is positioned on an interior side.

Each of the first glass plate 32 and the second glass plate 33 may be a glass plate similar to the glass plate 30. In other words, each of the first glass plate 32 and the second glass plate 33 may be made of either non-tempered glass or tempered glass. The first glass plate 32 and the second glass plate 33 may have the same thickness or different thicknesses.

The first glass plate 32 has a thickness of preferably at least 1.1 mm and at most 3.0 mm, for example. When the thickness of the first glass plate 32 is at least 1.1 mm, the first glass plate has a sufficient strength, such as a resistance to a flipped stone. When the thickness of the first glass plate 32 is at most 3.0 mm, the laminated glass 35 can avoid having an excessively large weight, which is preferable in terms of fuel consumption of the vehicle. The first glass plate 32 has a thickness of more preferably at least 1.5 mm and at most 2.8 mm, furthermore preferably at least 1.8 mm and at most 2.6 mm. The second glass plate 33 has a thickness of preferably at least 0.5 mm and at most 2.3 mm. When the thickness of the second glass plate 33 is at least 0.5 mm, it is easy to handle the glass plate. When the thickness of the second glass plate 33 is at most 2.3 mm, the laminated glass can avoid having an excessively large weight, which is preferable.

One or both of the first glass plate 32 and the second glass plate 33 may be formed in a wedge shape to have a thickness gradually increasing from a lower side (side adjacent to an engine hood) toward an upper side (side adjacent to a roof) when the laminated glass 35 is assembled to a vehicle.

Each of the first glass plate 32 and the second glass plate 33 may be formed in a plate shape by, for example, a float process, and be bent at a high temperature by gravity bending, press bending or the like. The laminated glass 35 may be formed in a complex curved shape to be bent both in a longitudinal direction and a transverse direction. Or, the laminated glass 35 may be a single curved shape to be bent in a longitudinal direction only or a transverse direction only. When the laminated glass 35 is curved, the laminated glass is preferably curved to be convex toward the exterior side. When the laminated glass 35 is curved, the laminated glass has a radius of curvature of preferably at least 1,000 mm and at most 100,000 mm. The first glass plate 32 and the second glass plate 33 may have the same radius of curvature or different radiuses of curvature. When the first glass plate 32 and the second glass plate 33 have different radiuses of curvature, the first glass plate 32 may have a larger radius of curvature than the second glass plate 33.

The interlayer 34 serves to bond the first glass plate 32 and the second glass plate 33. The interlayer 34 may be an interlayer made of polyvinyl butyral (PVB). When water resistance is particularly required, an ethylene-vinyl acetate copolymer (EVA) may be preferably used, and an acrylic photopolymerization prepolymer, an acrylic catalyst polymerization prepolymer, a photopolymerization prepolymer of acrylic ester and vinyl acetate, or polyvinyl chloride, or a similar substance may be used. The interlayer 34 may be formed in a single layer structure or a plural layer structure. The interlayer 34 has a thickness of preferably at least 0.5 mm and at most 3.0 mm. When the thickness of the interlayer 34 is at least 0.5 mm, it is possible to ensure penetration resistance required as a windshield. When the thickness of the interlayer 34 is at most 3.0 mm, the weight of the laminated glass can be reduced to have excellent handling.

The laminated glass 35 may have an optical shielding layer (not shown) disposed in a band shape on a peripheral edge area, the optical shielding layer being opaque and dark, such as black. The optical shielding layer may be disposed on each of the first glass plate 32 and the second glass plate 33 or on only one of the glass plates. The optical shielding layer performs a function of protecting a urethane sealant or the like from deterioration by ultraviolet lights, the urethane sealant or the like serving to bond and hold the laminated glass 35 to the vehicle. The optical shielding layer may be prepared by applying ceramic paste onto the first glass plate 32 and/or the second glass plate 33 and baking the applied ceramic paste. The optical shielding layer has a thickness of preferably at least 3 μm and at most 15 μm. Although there is no particular limitation to the width of the optical shielding layer, the width is preferably at least 20 mm and at most 300 mm.

In the vehicle window glass with a metal terminal 200, the second glass plate 33 has a cutout portion 36 formed in an arch shape in the peripheral edge area so as to pass through the second glass plate 33 in its thickness direction. The conductor 40 is disposed on a portion of the interior side of the first glass plate 32 exposed by the formation of the cutout portion 36. When the optical shielding layer is disposed, the conductor 40 may be disposed on the optical shielding layer.

The first base portion 14 and the second base portion 15 of the metal terminal 10 are electrically connected to, via the solders 50, to the conductor 40 disposed on the first glass plate 32. The lead wire 60 and the conductor 40 are electrically connected to each other via the metal terminal 10 and the solders 50. The metal terminal 10 is attached to the first glass plate 32 such that the rising portion 16A of the lead wire connection portion 16 and the third side 11C of the connection portion 11 face in a direction toward the peripheral edge of the laminated glass 35. The conductor 40 and the solders 50 in the vehicle window glass with a metal terminal 200 may be similar ones to those of the vehicle window glass with a metal terminal 100. It should be noted that the sum of the distance H1 between the center of the thickness of the connection portion 11 and the center of the thickness of each of the first base portion 14 and the second base portion 15, and the distance H2 between the fixing portion 16C and the center of the thickness of the connection portion 11 is larger than the sum of the thickness of the second glass plate 33 and the thickness of the interlayer 34.

The metal terminal 10 configured in the same as the vehicle window glass with a metal terminal 100 is applicable to the vehicle window glass with a metal terminal 200 as well. By this arrangement, even when an external force is applied to the lead wire 60, it is possible to reduce the occurrence of a crack in the first glass plate 32.

In the vehicle window glass with a metal terminal 100 and the vehicle window glass with a metal terminal 200, the conductor 40 may be utilized to form a busbar, which is not shown in the accompanying drawings. A plurality of busbars may be disposed, for example, along the peripheral edge area of the glass plate 30. Each of the busbars is electrically connected to the metal terminal 10 so as to be connected to an anode and a cathode of a power source. Between the busbars, heating wires may be disposed, for example.

The heating wires may be fine wires made of, for example, tungsten. In this case, adjacent heating wires may be disposed so as to be spaced to each other, or the heating wires may be disposed to cross one another in a mesh pattern. Instead of the heating wires, a transparent conductive film may be disposed. The transparent conductive film may be, for example, a metal film such as an Ag film, a metal oxide film such as a film of ITO (Indium Tin Oxide), or a resin film containing fine conductive particles. The transparent conductive film may have a plurality of kinds of films layered.

Figure 7:
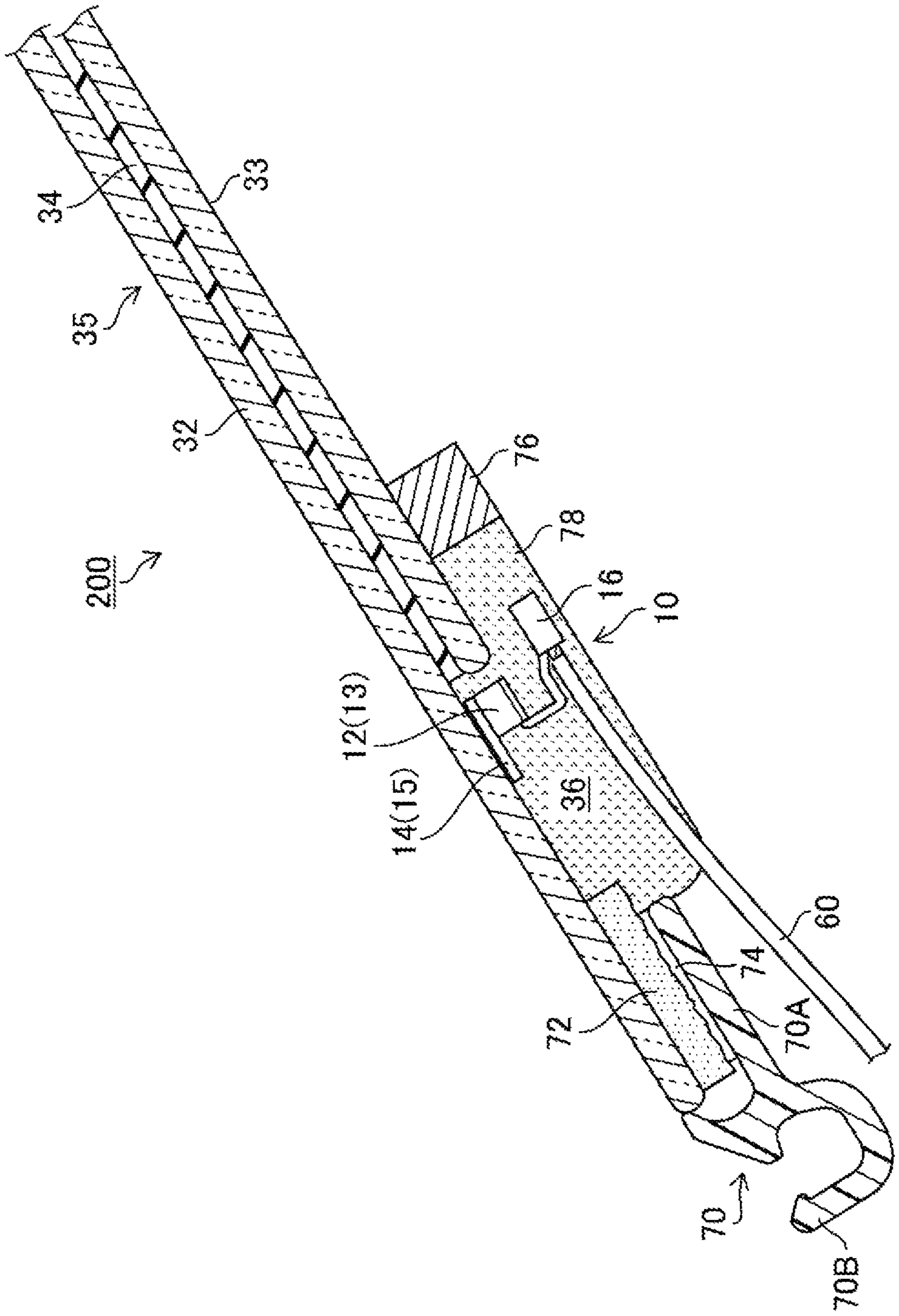
FIG. 7 is a cross-sectional view illustrating a case where the vehicle window glass shown in FIG. 6 has a molding attached thereto.

FIG. 7 is a cross-sectional view of the vehicle window glass with a metal terminal 200 shown in FIG. 6, wherein a molding 70 is further attached to the vehicle window glass. In FIG. 7, the conductor 40 and the solders 50 are not shown for simplification. As shown in FIG. 7, the laminated glass 35 has a spacer 72 attached to a portion of the cutout portion 36 and at a position on a peripheral edge of a lower side of the laminated glass. The spacer 72 includes a resin block in a plate shape, which has a thickness equal to the sum of the thickness of the second glass plate 33 and the thickness of the interlayer 34.

The molding 70 includes a flat plate portion 70A and a hook portion 70B. The flat plate portion 70A is disposed at a position facing the spacer 72 while the hook portion 70B is disposed at a position beyond the peripheral edge of the lower side of the laminated glass 35. The flat plate portion 70A of the molding 70 and the spacer 72 are bonded together by a double-sided adhesive tape 74.

The second glass plate 33 has, for example, a blocking member 76 attached to an interior side. The blocking member 76 has a height set at a higher position than the height of the metal terminal. It should be noted that the wording "height" means the height (length) from the interior side of the second glass plate 33.

The vehicle window glass with a metal terminal 200 is configured such that a sealing material 78 is disposed so as to embed the cutout portion 36, the metal terminal 10 and a portion of the lead wire 60. The sealing material 78 may be, for example, made of a silicone resin.

It should be noted that the metal terminal 10 has a height up to the lead wire connection 16, which is preferably larger than the thickness of the first glass plate 32. When the metal terminal 10 has such a height, the lead wire 60 connected to the metal terminal 10 is prevented from being largely bent in the sealing material 78, which is helpful to increase the service time of the lead wire 60.

The present invention has been described with reference to some embodiments. The invention is not limited to the embodiments, and various changes or modifications may be made without departing the spirit of the invention. The disclosed vehicle window glass with a terminal is applicable to, for example, a windshield, a backlite, a sidelite, or a quarter glass.

The entire disclosure of Japanese Patent Application No. 2020-199573 filed on Dec. 1, 2020 including specification, claims, drawings and summary is incorporated herein by reference in its entirety.

What is claimed is:

1. A vehicle window glass with a metal terminal, comprising:
- a glass plate;
- a conductor, the conductor disposed on at least one of principal surfaces of the glass plate; and
- a metal terminal, the metal terminal electrically connected to the conductor via solders;
- wherein the metal terminal comprises:
- a connection portion, the connection portion including a first side, a second side, a third side, and a fourth side, the second side opposing the first side, the third side and the fourth side being adjacent to the first side and the second side, and opposite to each other;
- a first leg portion, the first leg portion connected to the first side and separating the connection portion from the conductor;
- a first base portion, the first base portion connected to the first leg portion, electrically connected to the conductor via a solder, and projecting toward a direction away from the fourth side starting from an imaginary extension line of the third side;
- a second leg portion, the second leg portion connected to the second side and separating the connection portion from the conductor;
- a second base portion, the second base portion connected to the second leg portion, electrically connected to the conductor via a solder, and projecting toward a direction away from the fourth side starting from an imaginary extension line of the third side; and
- a lead wire connection portion, the lead wire connection portion connected to the third side of the connection portion, the lead wire connection portion including a rising portion extending in a direction remote from the conductor, a bent portion connected to the rising portion and extending toward the fourth side, and a fixing portion connected to the bent portion and connected to a lead wire.

2. The vehicle window glass according to claim 1, wherein the metal terminal contains at least one selected from the group consisting of copper, brass, iron, chromium, and an alloy containing copper, brass, iron and chromium.

3. The vehicle window glass according to claim 1, wherein the fixing portion comprises a caulking portion.

4. The vehicle window glass according to claim 1, wherein the lead wire is fixed to a surface of the fixing portion remote from the conductor.

5. The vehicle window glass according to claim 1, wherein the lead wire is fixed to the fixing portion in a direction extending from the fixing portion beyond the third side of the connection portion made of an insulator.

6. The vehicle window glass according to claim 1, wherein the glass plate comprises tempered glass.

7. The vehicle window glass according to claim 1, wherein the glass plate comprises non-tempered glass.

8. The vehicle window glass according to claim 1, wherein the solders comprise leaded solders.

9. The vehicle window glass according to claim 1, wherein the solders comprise lead-free solders.

10. The vehicle window glass according to claim 9, wherein each of the solders contains at least 95 weight % of tin.

11. The vehicle window glass according to claim 1, wherein the glass plate includes a first glass plate, a second glass plate, and an interlayer boning the first glass plate and the second glass plate.

12. The vehicle window glass according to claim 11, wherein the second glass plate has a cutout portion formed therein so as to pass therethrough in a thickness direction thereof, and the metal terminal is disposed on a surface of the first glass plate exposed by the cutout portion.

13. The vehicle window glass according to claim 12, wherein the first glass plate is disposed on an exterior side of a vehicle while the second glass plate is disposed on an interior side of the vehicle.

14. The vehicle window glass according to claim 11, wherein the first glass plate is disposed on an exterior side of a vehicle while the second glass plate is disposed on an interior side of the vehicle.

* * * * *